United States Patent
Braunstein et al.

(10) Patent No.: US 12,272,382 B2
(45) Date of Patent: Apr. 8, 2025

(54) METHODS AND SYSTEMS FOR PRESENTING MEDIA CONTENT WITH MULTIPLE MEDIA ELEMENTS IN AN EDITING ENVIRONMENT

(71) Applicant: Google LLC, Mountain View, CA (US)

(72) Inventors: Ariel Braunstein, San Francisco, CA (US); Nicholas Matarese, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/921,148

(22) PCT Filed: Nov. 11, 2021

(86) PCT No.: PCT/US2021/058940
§ 371 (c)(1),
(2) Date: Oct. 25, 2022

(87) PCT Pub. No.: WO2023/086091
PCT Pub. Date: May 19, 2023

(65) Prior Publication Data
US 2024/0233768 A1 Jul. 11, 2024

(51) Int. Cl.
G11B 27/031 (2006.01)
G06F 3/0482 (2013.01)
G06F 3/0485 (2022.01)

(52) U.S. Cl.
CPC .......... *G11B 27/031* (2013.01); *G06F 3/0482* (2013.01); *G06F 3/0485* (2013.01)

(58) Field of Classification Search
CPC ....... G11B 27/031; G11B 27/00; G11B 27/02; G11B 27/022; G11B 27/029;
(Continued)

(56) References Cited

U.S. PATENT DOCUMENTS 10,432,559 B2 10/2019 Baldwin et al.
2006/0224940 A1 10/2006 Lee
(Continued)

FOREIGN PATENT DOCUMENTS

JP  2018074337 A  5/2018
KR  20100086136 A  7/2010
(Continued)

OTHER PUBLICATIONS

Office Action, and translation thereof, from counterpart Korean Application No. 10-2022-7039449 dated Sep. 26, 2023, 13 pp.
(Continued)

*Primary Examiner* — Thai Q Tran
*Assistant Examiner* — Nienru Yang
(74) *Attorney, Agent, or Firm* — Shumaker & Sieffert, P.A.

(57) ABSTRACT

In one example, a system comprises a hardware processor that is configured to: receive a request to modify a video content item containing a plurality of media elements; present a user interface that includes a video track representation of the video content item and a layered representation of the plurality of media elements, wherein each media element is represented by a media overlay element positioned proximal to the video track representation, wherein at least one media overlay element overlaps at least another media overlap element to provide a compact representation of the plurality of media elements; and in response to receiving a selected time position within the video track representation, update the layered representation within the user interface to present an expanded overlay list that includes media overlay elements corresponding to the subset of the plurality of media elements that occur at the selected time position.

21 Claims, 8 Drawing Sheets

(58) Field of Classification Search
CPC ... G11B 27/036; G06F 3/0482; G06F 3/0485; G06V 20/49; H04N 21/47205
USPC ........................................................ 386/278
See application file for complete search history.

(56) References Cited

U.S. PATENT DOCUMENTS

| | | | |
|---|---|---|---|
| 2007/0239788 | A1 | 10/2007 | Cunningham et al. |
| 2015/0019972 | A1* | 1/2015 | Matsuda ................. G06F 3/048 715/723 |
| 2017/0300189 | A1* | 10/2017 | Pendergast ............. G11B 27/34 |
| 2018/0364904 | A1* | 12/2018 | Bernstein ............ G06F 3/04845 |
| 2020/0302029 | A1* | 9/2020 | Holm ...................... G06N 20/00 |

FOREIGN PATENT DOCUMENTS

| | | |
|---|---|---|
| KR | 101862372 B1 | 5/2018 |
| KR | 101873897 B1 | 8/2018 |
| KR | 102274723 B1 | 7/2020 |
| KR | 20210059013 A | 5/2021 |
| WO | 2011128829 A2 | 10/2011 |

OTHER PUBLICATIONS

Notice of Intent to Grant, and translation thereof, from counterpart Korean Application No. 10-2022-7039449 dated Dec. 26, 2023, 5 pp.
Notice of Intent to Grant from counterpart Japanese Application No. 2022-568897 dated Jan. 22, 2024, 7 pp.
International Search Report and Written Opinion dated May 19, 2023 in International Patent Application No. PCT/US2021/058940.
Kost, J., "Using the New Video Features in Photoshop CS6 | Adobe", YouTube, last updated Apr. 23, 2012, 1 page, available at: https://www.youtube.com/watch?v=praOG6jJxpc.

* cited by examiner

METHODS AND SYSTEMS FOR PRESENTING MEDIA CONTENT WITH MULTIPLE MEDIA ELEMENTS IN AN EDITING ENVIRONMENT

TECHNICAL FIELD

The disclosed subject matter relates to methods, systems, and media for presenting media content with multiple media elements in an editing environment.

BACKGROUND

Video editing is an intricate task that is not easily approached by content creators, who often use mobile devices having displays of limited size to capture, edit, and/or upload such videos to social sharing sites. Desktop video editing software can achieve high-quality results by representing the many elements of a media content item in multiple dimensions (e.g., temporal, spatial, and z-order). This complex environment allows users to make spatial modifications over the temporal axis as well as additional manipulations like the application of effects, transitions, filters, animations, etc. at particular portions of the video Such a desktop environment for visual tasks like video editing, however, is difficult to replicate in a mobile device environment due to the lack of workspace as mobile devices often have displays of limited size.

Developers of video editing applications for mobile devices have approached the lack of screen size by designing a workspace to exist off-screen in a virtual environment. In this approach, the user spends much of their time scrolling in both horizontal and vertical directions through a multi-track editing environment in order to complete the video editing tasks. Another approach by developers has been to remove features and therefore focus on simple use-cases. However, removing these features, such as editing features, results in an application which limits the production value and quality of results achievable by users.

Accordingly, it is desirable to provide new mechanisms for presenting media content with multiple media elements in an editing environment. For example, these new mechanisms for presenting media content with multiple media elements can be provided that can fit into the limited display of a mobile device, while allowing a user to create and/or modify the media content within the limited display of the mobile device.

SUMMARY

Methods, systems, and media for presenting media content with multiple media elements in an editing environment are provided.

In accordance with some embodiments of the disclosed subject matter, a method for editing media content items is provided, the method comprising: receiving, using a computing device having a display, a request to modify a video content item containing a plurality of media elements; presenting a user interface that includes a video track representation of the video content item and a layered representation of the plurality of media elements occurring within the video content item, wherein each of the plurality of media elements is represented by a media overlay element that is positioned proximal to the video track representation and wherein the media overlay element has one or more visual characteristics; in response to receiving a selected time position within the video track representation, updating the layered representation within the user interface to present an expanded overlay list that includes media overlay elements corresponding to the subset of the plurality of media elements that occur at the selected time position within the video content item; and, in response to receiving a selected media overlay element from the expanded overlay list, updating a media window in the user interface to present a video frame corresponding to the selected time position and the media element applied to the video frame corresponding to the selected media overlay element.

In some embodiments, the plurality of media elements includes a plurality of visual layers and the plurality of visual layers are presented in a first layered representation that is positioned above the video track representation in the user interface.

In some embodiments, the plurality of media elements includes a plurality of audio layers and the plurality of audio layers are presented in a second layered representation that is positioned below the video track representation in the user interface.

In some embodiments, in response to receiving the selected media overlay element from the expanded overlay list, the selected media overlay element is positioned within the video track representation and unselected media overlay elements are presented in the layered representation of the plurality of media elements occurring at the selected time position within the video content item.

In some embodiments, the one or more visual characteristics includes at least one color applied to a media overlay element and at least one pattern applied to the media overlay element.

In some embodiments, the expanded overlay list is presented in place of the layered representation of the plurality of media elements in response to receiving the selected time position within the video track representation and wherein the expanded overlay list is collapsed into the layered representation of the plurality of media elements in response to receiving the selected media overlay element from the expanded overlay list.

In some embodiments, the method further comprises providing one or more editing tools associated with the media element applied to the video frame corresponding to the selected media overlay element.

In some embodiments, the method further comprises: determining that a first media element and a second media element share at least one timestamp on the video track representation; and causing a first media overlay element corresponding to the first media element to have a vertical offset on the video track representation from a second overlay element corresponding to the second media element.

In some embodiments, the method further comprises: determining that a height of the expanded overlay list being presented on the display of the computing device exceeds the height of the display of the computing device; and, in response to determining that the height of the expanded overlay list being presented on the display of the computing device exceeds the height of the display of the computing device, allowing the expanded overlay list to be scrolled in a vertical direction to review each of the media overlay elements in the expanded overlay list.

In some embodiments, each of the media overlay elements has a width that corresponds to a duration of the media element within the video content item.

In accordance with some embodiments of the disclosed subject matter, a system for editing media content items is provided, the system comprising a hardware processor that is configured to: receive, using a computing device having a display, a request to modify a video content item containing a plurality of media elements; present a user interface that includes a video track representation of the video content item and a layered representation of the plurality of media elements occurring within the video content item, wherein each of the plurality of media elements is represented by a media overlay element that is positioned proximal to the video track representation and wherein the media overlay element has one or more visual characteristics; in response to receiving a selected time position within the video track representation, update the layered representation within the user interface to present an expanded overlay list that includes media overlay elements corresponding to the subset of the plurality of media elements that occur at the selected time position within the video content item; and, in response to receiving a selected media overlay element from the expanded overlay list, update a media window in the user interface to present a video frame corresponding to the selected time position and the media element applied to the video frame corresponding to the selected media overlay element.

In accordance with some embodiments of the disclosed subject matter, a non-transitory computer-readable medium containing computer executable instructions that, when executed by a processor, cause the processor to execute a method for editing media content items is provided, the method comprising: receiving, using a computing device having a display, a request to modify a video content item containing a plurality of media elements; presenting a user interface that includes a video track representation of the video content item and a layered representation of the plurality of media elements occurring within the video content item, wherein each of the plurality of media elements is represented by a media overlay element that is positioned proximal to the video track representation and wherein the media overlay element has one or more visual characteristics; in response to receiving a selected time position within the video track representation, updating the layered representation within the user interface to present an expanded overlay list that includes media overlay elements corresponding to the subset of the plurality of media elements that occur at the selected time position within the video content item; and, in response to receiving a selected media overlay element from the expanded overlay list, updating a media window in the user interface to present a video frame corresponding to the selected time position and the media element applied to the video frame corresponding to the selected media overlay element.

In accordance with some embodiments of the disclosed subject matter, a system for editing media content items is provided, the system comprising: means for receiving, using a computing device having a display, a request to modify a video content item containing a plurality of media elements; means for presenting a user interface that includes a video track representation of the video content item and a layered representation of the plurality of media elements occurring within the video content item, wherein each of the plurality of media elements is represented by a media overlay element that is positioned proximal to the video track representation and wherein the media overlay element has one or more visual characteristics; means for updating the layered representation within the user interface to present an expanded overlay list that includes media overlay elements corresponding to the subset of the plurality of media elements that occur at the selected time position within the video content item in response to receiving a selected time position within the video track representation; and means for updating a media window in the user interface to present a video frame corresponding to the selected time position and the media element applied to the video frame corresponding to the selected media overlay element in response to receiving a selected media overlay element from the expanded overlay list.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
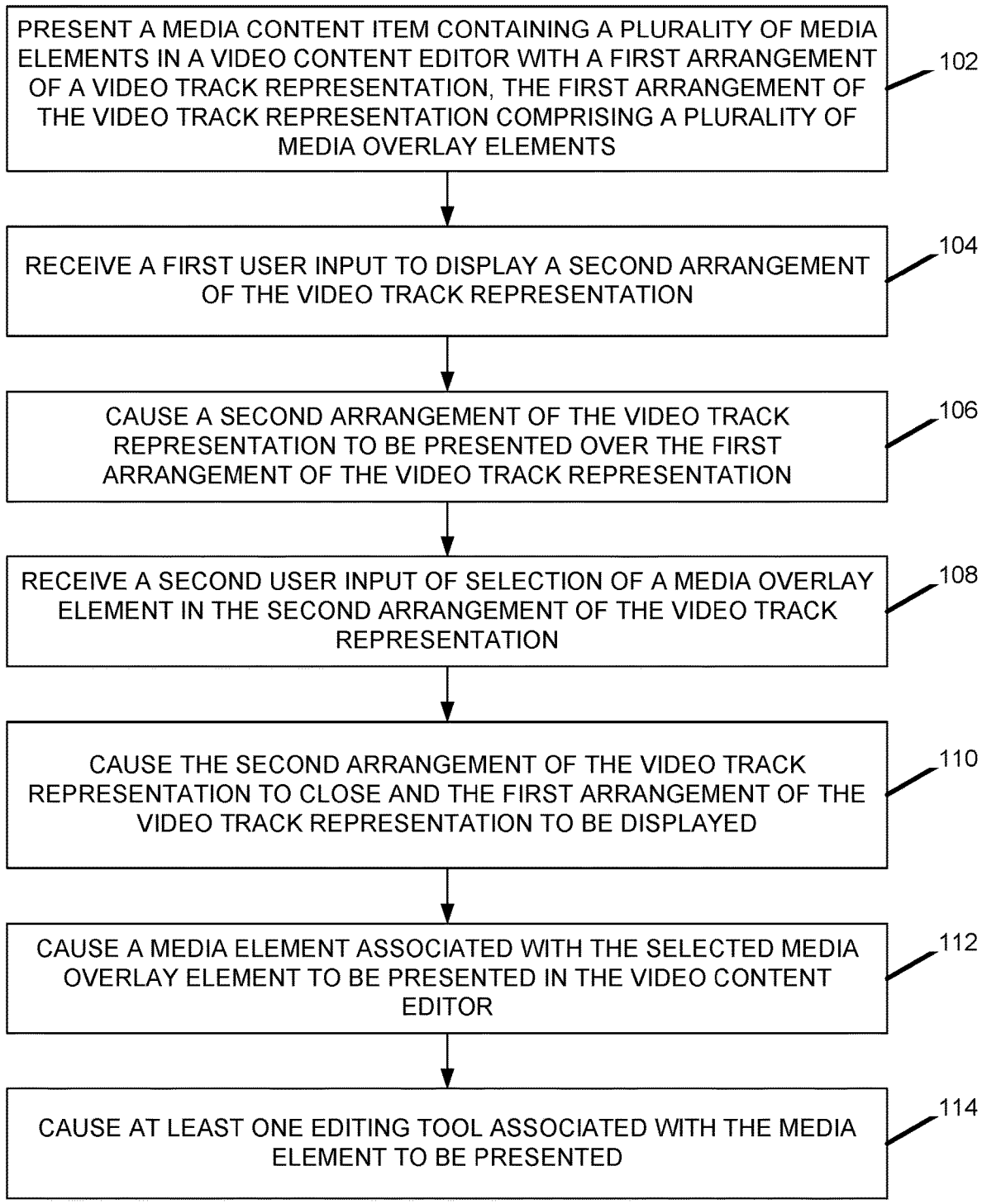
FIG. 1 shows an illustrative example of a process for presenting media content with multiple media elements in an editing environment in accordance with some embodiments of the disclosed subject matter.

In accordance with various embodiments, mechanisms (which can include methods, systems, and media) for presenting media content with multiple media elements in an editing environment are provided.

Generally speaking, the mechanisms can generate a layered representation that allows a user, such as a content creator, to review and/or edit portions of a video. For example, the layered representation can be a compact representation that includes one or more visual layers and/or one or more audio layers. In continuing this example, each of the one or more visual layers and/or one or more audio layers can be presented as an overlay element in an expandable overlay list. In some embodiments, the layered representation can include a video track representation of the video that allows the user to navigate through the video (e.g., by scrolling horizontally via a touchscreen input), to select content for editing or adjustment, to rearrange content, to add new media or media elements, etc.

For example, the layered representation can provide the user with an opportunity to select a particular time within a video track representation and, in response to selecting a particular time within the video timeline representation (e.g., by scrolling horizontally through the video timeline via a touchscreen input), the mechanisms can present an expanded overlay list that includes a subset of the one or more visual layers and/or one or more audio layers that are present in the video at the selected time. The expanded overlay list can include overlay elements for each of the subset of visual layers and/or audio layers that can be selected by the user for editing or adjustment.

It should be noted that each overlay element can, in some embodiments, have a visual characteristic (e.g., a particular color, a particular shape, a particular pattern, etc.). For example, upon inserting multiple media elements within a video (e.g., an audio track for a particular duration of the video, a text overlay for a particular duration of the video, a sticker for a particular duration of the video, an image overlay for a particular duration of the video, a motion effect for a particular duration of the video), each overlay element that corresponds to a media element can have a particular color and a particular pattern (e.g., a combed edge) based on the type of media element. This can, for example, provide the user with a visual indication of the media elements within the video having the same media type (e.g., each of the overlay elements for text elements are colored blue and have a combed edge and each of the overlay elements for audio track elements are colored purple and have a wavy edge).

It should also be noted that each overlay element can, in some embodiments, visually indicate its relative duration within the video. For example, the width of the overlay element can correspond with the start time of a media element to the end time of the media element (e.g., a motion effect that is applied from 2:01 minutes from the beginning of the video through 2:22 minutes from the beginning of the video).

In some embodiments, the visual layers and the audio layers can be separated in the layered representation. For example, in implementations in which a layered representation includes a video track representation of the video, the overlay elements corresponding to the visual layers within the video can be positioned above the video track representation and the overlay elements corresponding to the audio layers within the video can be positioned beneath the video track representation. In another example, in implementations in which a layered representation includes a video track representation of the video, the overlay elements corresponding to the visual layers within the video can be positioned above the video track representation, the overlay elements corresponding to the audio layers within the video can be positioned beneath the video track representation, and the overlay elements can be positioned below a video window that presents the video, playback options for controlling the playback of the video, and a timeline associated with the video window.

In some embodiments, the expanded overlay list can exceed the height of the device display. In such an embodiment, the expanded overlay list can be navigated (e.g., by scrolling vertically through the expanded overlay list) to review each of the overlay elements included in the expanded overlay list.

In some embodiments, upon selecting an overlay element from the expanded overlay list, the corresponding visual and/or audio layer can be presented on the display for editing and/or adjustment. For example, in response to selecting an overlay element that corresponds to a visual layer, the overlay element can be positioned over the timeline representation and a video window can present one or more video frames of the video at the selected time in which the media element corresponding to the visual layer can be edited and/or adjusted within the video window.

These mechanisms can be used in a variety of applications. For example, these mechanisms can be used to generate the layered representation such that a user can annotate a video (e.g., a short form video) with a title card, background audio, an audio effect (e.g., a voiceover), and animated graphics while using a mobile device having a limited screen size. In another example, these mechanisms can be used to generate the layered representation such that a user can adjust the timing of any media annotations or elements already present within a video, such as to extend the duration of a title card for a longer time period. In yet another example, these mechanisms can be used to generate the layered representation such that a user can edit a video that contains multiple elements occurring at the same time. In continuing this example, a user can toggle between editing menus associated with each element by selecting visual indicators of the media element already present within the video. In a further example, a user can scroll through video frames while also viewing the visual indicators associated with video frames being presented on the device display. In another further example, a user can toggle the view of all media elements within the video. In this example, a user can then toggle the desired media element and re-position, scale, or otherwise manipulate the desired element within the video frame.

It should be noted that, although the embodiments described herein generally relate to editing a media content item for uploading to a social sharing service, this is merely illustrative. For example, the layered representation can be used to provide a compact representation of the media components that form a media content item used in an advertisement. In another example, in an application that allows a user to generate presentations, the layered representation can be used to represent a media content item (e.g., an animation and its components) being inserted into a slide generated using the presentation application.

Turning to FIG. 1, an illustrative example of a process 100 for presenting media content with multiple media elements in an editing environment in accordance with some embodiments is shown. In some embodiments, process 100 can be executed by a user device. For example, in some embodiments, process 100 can be executed when a user is executing any suitable application (e.g., a video editing application, an image capturing application, a video recording application, a media storage application, a presentation application, etc.) on a smartphone, a tablet, a laptop computing device, a desktop computing device, and/or any other suitable user device.

In some embodiments, process 100 can begin at block 102 by displaying a media content item and a video track representation within a media editor. In some embodiments, the media content item can contain video footage, audio files, media effects, and/or any other suitable media. This can include, for example, determining which audio files, media effects, and/or any other suitable media elements appear for particular time durations within the media content item. In some embodiments, at block 102, the media content item, the video track representation, and/or any other suitable components within the media editor can be displayed as shown below in FIG. 2A.

In some embodiments, as shown and described further below in connection with FIG. 2A, the media components occurring within the media content item can be represented as a layered representation that allows a user, such as a content creator, to review and/or edit portions of a video. For example, the layered representation can be a compact representation that includes one or more visual layers and/or one or more audio layers. In continuing this example, the layered representation can include a video track representation of the video that allows the user to navigate through the video (e.g., by scrolling horizontally via a touchscreen input), to select a visual layer or an audio layer for editing or adjustment, to rearrange content, to add new media or media elements, etc.

It should be noted that each overlay element in the layered representation can, in some embodiments, have a visual characteristic (e.g., a particular color, a particular shape, a particular pattern, etc.). For example, upon inserting multiple media elements within a video (e.g., an audio track for a particular duration of the video, a text overlay for a particular duration of the video, a sticker for a particular duration of the video, an image overlay for a particular duration of the video, a motion effect for a particular duration of the video), each overlay element that corresponds to a media element can have a particular color and a particular pattern (e.g., a combed edge) based on the type of media element. In another example, each overlay element can include text describing the type of media element (e.g., a bubble effect that is applied to a portion of the video, a text field that has been inserted over a portion of the video, etc.). This can, for example, assist the user in identifying different media elements contained within the video (e.g., where overlay elements corresponding to text elements are shown in blue while overlay elements corresponding to visual effects applied to a portion of the video are shown in yellow) and assist the user in determining the type of media element (e.g., where stickers have the same or similar colors and/or the same edge pattern on the corresponding overlay element) prior to selecting a media element for editing.

It should also be noted that each overlay element can, in some embodiments, visually indicate its relative duration within the video. For example, the width of the overlay element that is positioned along the media timeline can correspond with the start time of a media element to the end time of the media element (e.g., a motion effect that is applied from 2:01 minutes from the beginning of the video through 2:22 minutes from the beginning of the video).

It should further be noted that, in some embodiments, the visual layers and the audio layers can be separated in the layered representation. For example, in implementations in which a layered representation includes a video track representation of the video, the overlay elements corresponding to the visual layers within the video (e.g., text overlays, animations, stickers, images, visual effects, etc.) can be positioned above the video track representation and the overlay elements corresponding to the audio layers within the video (e.g., sounds, sound effects, audio modifications, background music tracks, etc.) can be positioned beneath the video track representation. In another example, in implementations in which a layered representation includes a video track representation of the video, the overlay elements corresponding to the visual layers within the video can be positioned above the video track representation, the overlay elements corresponding to the audio layers within the video can be positioned beneath the video track representation, and the overlay elements can be positioned below a video window that presents the video, playback options for controlling the playback of the video, and a timeline associated with the video window.

In some embodiments, process 100 can continue to block 104 when process 100 receives a user input. For example, in some embodiments, a user can tap on a portion of the video track representation, and/or any suitable area near the video track representation. In a more particular example, the user can horizontally scroll along the video track representation and can select a particular time position in the video track representation. In continuing this example, a video window can present a video frame or any other suitable preview corresponding to the currently selected time position in the video track representation. The video window can, in some embodiments, include a timeline that shows the selected time position of the video.

In some embodiments, at block 106, process 100 can cause the media editor to display the media elements occurring at the time point indicated within the video track representation in response to receiving the user input at block 104. For example, a particular media element can be represented on the video track representation by a particular overlay element and the media elements occurring at the time point indicated within the video track representation can be represented in an expanded overlay list that includes the corresponding overlay elements. In continuing this example, process 100 can provide a focused state for selecting and/or editing a particular media element occurring at the time point indicated within the video track representation.

Figure 2A:
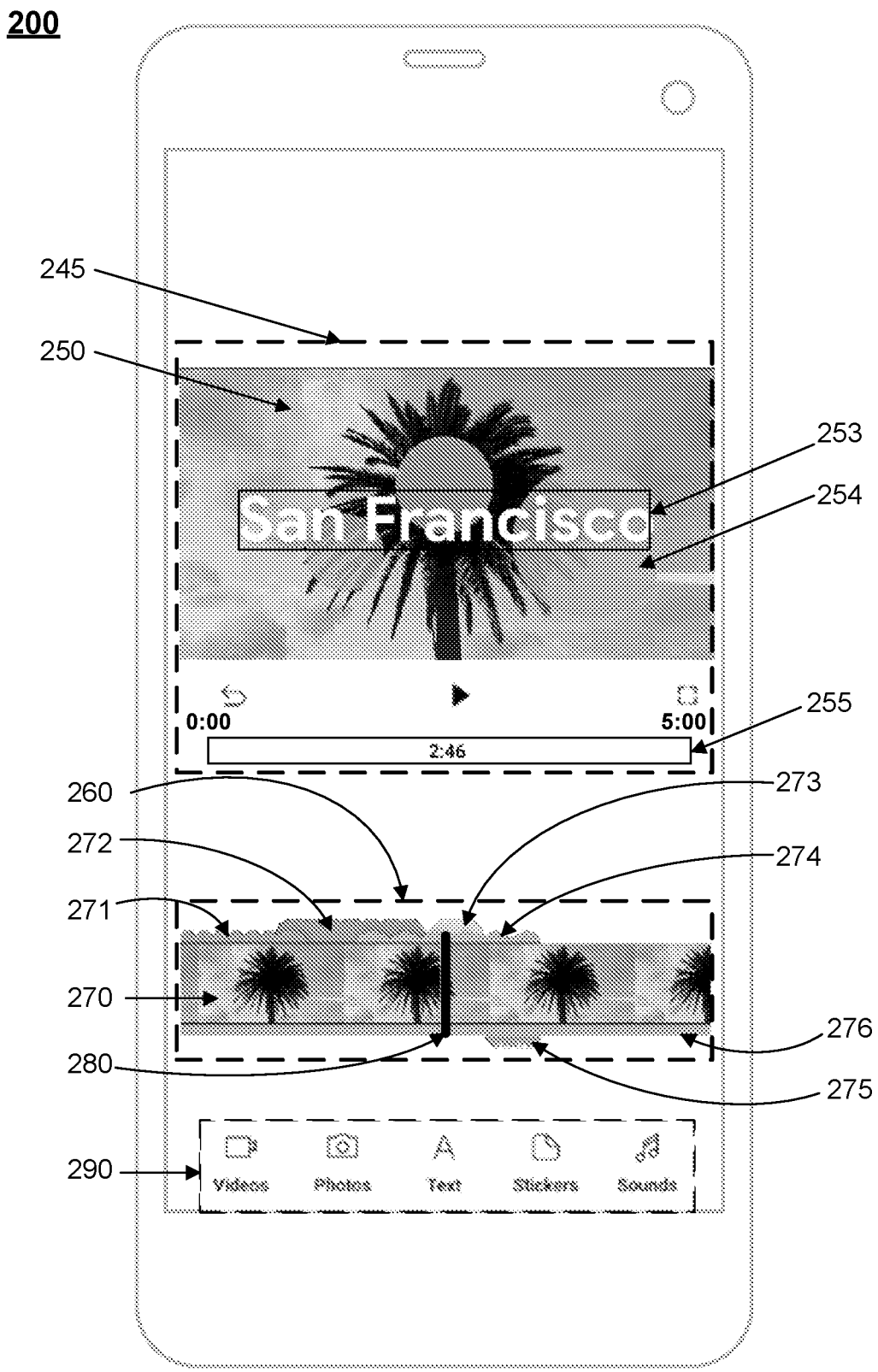
FIGS. 2A, 2B, 2C, 2D, and 2E show examples of a media editing graphical user interface in accordance with some embodiments of the disclosed subject matter.
Figure 2B:
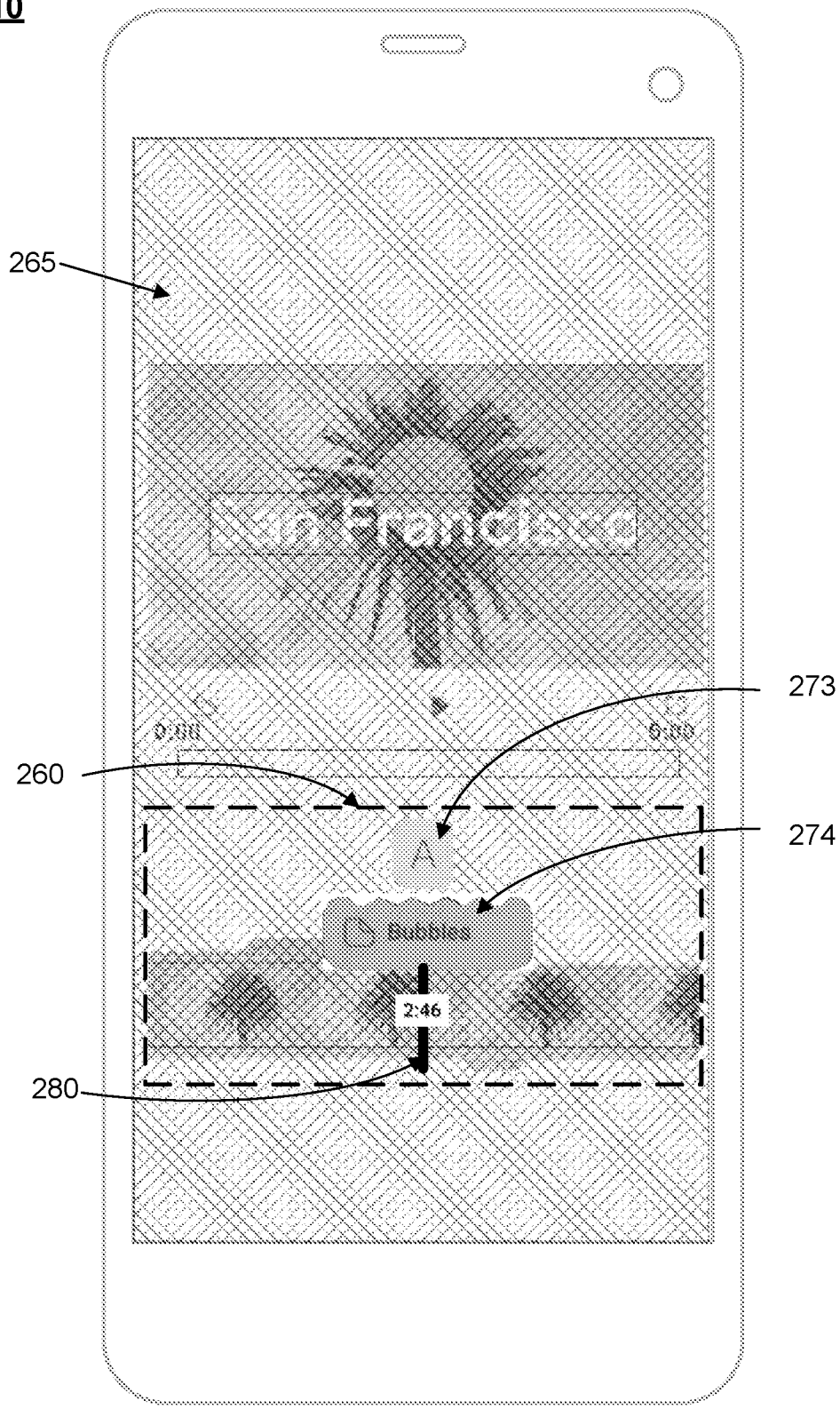

A more particular example of the media editor is shown in FIG. 2B. For example, an expanded overlay list that includes a subset of the one or more visual layers and/or one or more audio layers that are present in the video at the selected time. The expanded overlay list can include overlay elements for each of the subset of visual layers and/or audio layers that can be selected by the user for editing or adjustment, where each of the overlay elements has a particular visual characteristic (e.g., a particular color, a particular shape, a particular pattern, etc.).

In some embodiments, process 100 can determine that the size of the expanded overlay list has exceeded the height of the device display. In such an embodiment, process 100 can receive navigational inputs (e.g., swiping up and swiping down user inputs) that allow the expanded overlay list to be navigated, thereby allowing the user to review and/or select an overlay element from each of the overlay elements included in the expanded overlay list. In a more particular example, in order to allow the user to select one of the overlay elements included in the expanded overlay list that extends past the height of the device display, process 100 can activate a temporary vertical scrolling input or any other suitable navigational input that allows the user to vertically navigate through the expanded overlay list, where the expanded overlay list vertically shifts to present overlay elements that are not currently being presented in the expanded overlay list on the device display.

In some embodiments, at block 108, the user can select one of the media elements for viewing and/or editing within the video. For example, the user can select an overlay element from an expanded overlay list that includes overlay elements representing the visual layers and/or audio layers occurring at the time point indicated within the video track representation.

Figure 2C:
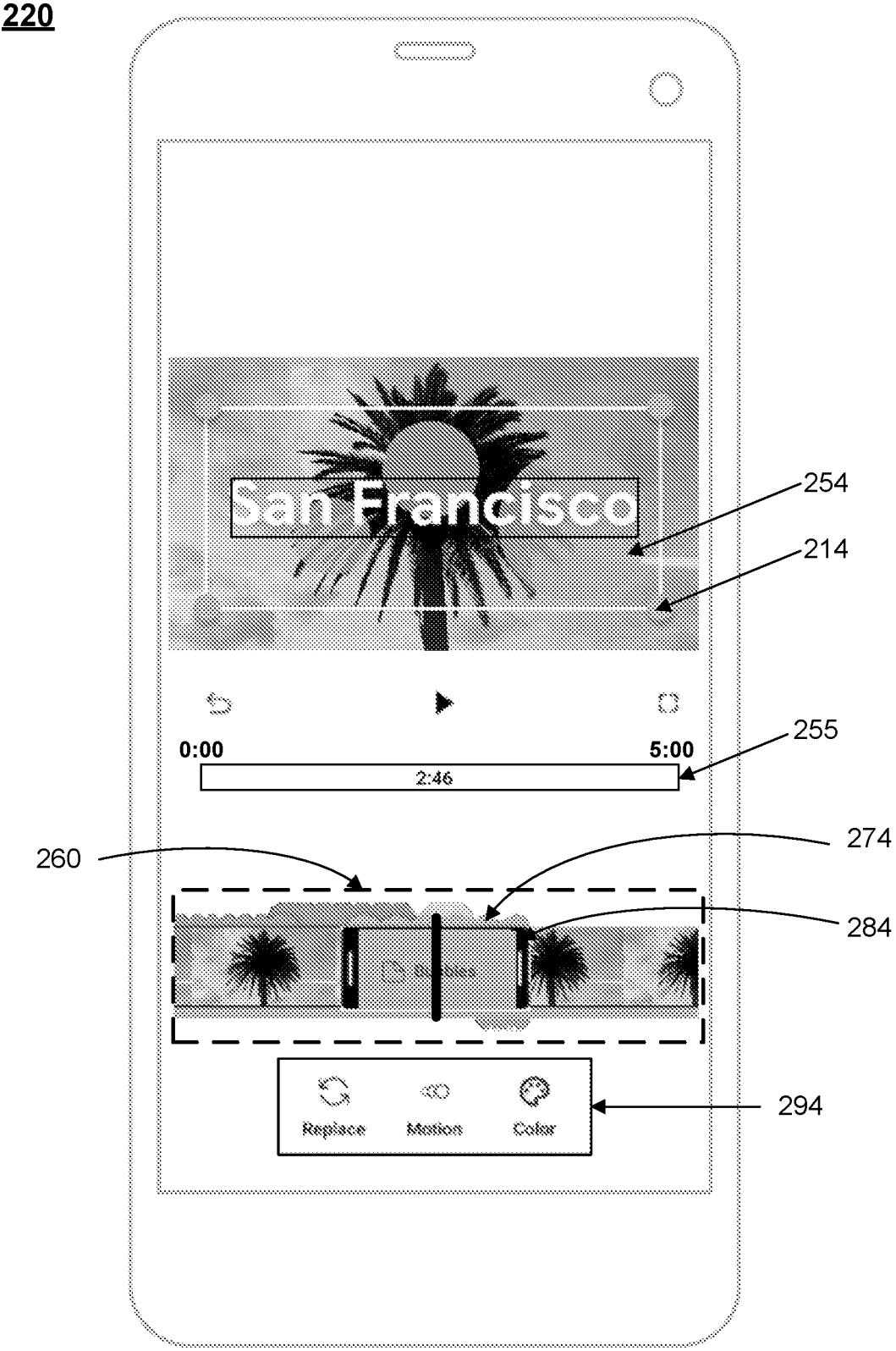

In some embodiments, at block 110, process 100 can cause the media editor to return to displaying the media content item, the video track representation, and/or any other suitable components in response to receiving the selected media element. In some embodiments, the presentation of the video track representation can be modified such that the selected media element is more prominently positioned within the video track representation. For example, in some embodiments, the selected overlay element from the expanded overlay list can be positioned within the video track representation to indicate the time position and duration of the corresponding media element within the video track representation. In continuing this example, the remaining overlay elements from the expanded overlay list that were not selected by the user can collapse, contract, or otherwise return into the layered representation. A more particular example of the media editor is shown in FIG. 2C.

In some embodiments, process 100 can continue to block 112 and can display the media content item with the media element corresponding to the selected overlay element. For example, in response to selecting an overlay element from an expanded overlay list and modifying the video track representation to indicate the selected overlay element, the media editor can present the media content item with the corresponding media element layered on the media content item, where the media element can be modified by the user. In continuing this example, the media editor can allow the user to re-position, re-size, remove, or otherwise manipulate the media element.

In some embodiments, at block 114, process 100 can display any suitable editing menus associated with the selected media element. For example, as shown below in FIG. 2C, the selected media element can be a title card and accompanying graphic in some embodiments. Continuing this example, in some embodiments, process 100 can display a keyboard, cursor, resize handles, color palette, etc., and/or any other suitable editing tool associated with the title card and accompanying graphic. Note that, in some embodiments, process 100 can adjust the display of the media element to include editing tools and/or can add toolbars associated with the media element to the media editor.

It should be understood that at least some of the above-described blocks of the process of FIG. 1 can be executed or performed in any order or sequence not limited to the order and sequence shown in and described in connection with the figure. Also, some of the above blocks of the process of FIG. 1 can be executed or performed substantially simultaneously where appropriate or in parallel to reduce latency and processing times. Additionally or alternatively, some of the above described blocks of the process of FIG. 1 can be omitted.

Turning to FIG. 2A, an illustrative example of a user interface 200 for presenting media content with multiple media elements in an editing environment in accordance with some embodiments is shown. As illustrated, user interface 200 can include a media content window 245, a video track representation 260, and a toolbar 290 in some embodiments. In some embodiments, user interface 200 can be included within any suitable media editing application. For example, as illustrated, user interface 200 can be presented as a feature within a mobile video editor, where a user has previously loaded media content. In another example, user interface 200 can be presented as a feature to edit an animation being presented within a presentation created using a slideshow presentation application.

In some embodiments, media content window 245 can include any suitable features of a media player found in an editing environment. For example, as illustrated, media content window 245 can include a timestamp, a playback position indicator, a timeline 255 that includes a start time of the video, an end time of the video, and the timestamp and the playback position indicator along timeline 255, a play/pause button, a full screen button, and/or any other suitable control buttons. In some embodiments, media content item 250 can be shown in media content window 245 and playback of media content item 250 can be synchronized to video track representation 260.

In some embodiments, media content item 250 can contain audio components, video footage, audio elements such as background audio, audio effects (e.g., cartoon sounds, voice overlays, audio distortion effects, etc.), visual elements (e.g., stickers, text overlays, supplemental graphics, picture-in-picture, etc.), and/or any other suitable media elements. For example, media content item 250, as illustrated, contains video footage of a palm tree with clouds, a media element 253 (e.g., the text "San Francisco") layered over a particular portion of the video, and a media element 254 (e.g., a bubble graphic with four colored circles of varying size) layered over a particular portion of the video.

As discussed below in connection with FIGS. 2C and 2E, in some embodiments, media content window 245 can include spatial editing tools such as selectable tiles, windows, handles, etc., for adjusting the appearance of media elements.

In some embodiments, video track representation 260 can include video frame representations 270, media overlay elements 271-276, and time code marker or playback position indicator 280. In some embodiments, video track representation 260 can include any other suitable features. In some embodiments, video track representation 260 can allow a user to move between different time points within a media content item. For example, in some embodiments, sliding video track representation 260 in a horizontal motion can allow a user to access earlier or later time points of the media content item.

In some embodiments, media elements shown in media content window 245 can be specified by a media overlay element within video track representation 260. For example, as illustrated, media overlay element 273 can represent the occurrence of media element 253 in media content item 250. In some embodiments, the location of media overlay element 273 along video track representation 260 can correspond to the duration for which media element 253 appears in the media content item. In some embodiments, media overlay elements 271-276 can be selectable by a user, as discussed above in connection with FIG. 1, at block 104 of process 100.

In some embodiments, video frames 270 and media overlay elements 271-276 can be layered, using any suitable layering model, within video track representation 260. In some embodiments, video frames 270 and media overlay elements 271-276 can be layered using z-order stacking. For example, in some embodiments, video frames 270 can be the foremost layer with media overlay elements 217-276 appearing "underneath" video frames 270. In another example, in some embodiments, two or more media overlay elements (e.g., media overlay elements 273 and 274) can overlap in video track representation 260. Continuing this example, media overlay element 273 can be vertically offset from media overlay element 274, e.g., arranged in a "lower" layer. In another example, in some embodiments, media elements that are similar (e.g., stickers) can be grouped to the same vertical offset (layer depth).

In some embodiments, media overlay elements 271-276 can have a variety of visual characteristics (e.g., shape, edge pattern, outline, fill pattern and/or color, etc.). For example, as illustrated, media overlay element 271 can have a scallop edge pattern and a solid (blue) fill color. In another example, as illustrated, media overlay element 273 can have a straight edge with rounded corners and a solid (yellow) fill color. In some embodiments, while appearing in the z-order, design elements of media overlay element 271-276 can be hidden behind video frames 270. For example, as shown in FIG. 2A, the top edges of media overlay elements 271-274 and the bottom edges of media overlay elements 275 and 276 are visible. In this example, media overlay elements 271-276 can have text, shapes, and/or any other suitable design features on the portion of the overlay element which is obscured by video frames 270 as a consequence of layering.

Note that, although six media overlay elements are shown, any suitable number of media overlay elements can be shown on video track representation 260.

In some embodiments, time code marker 280 can be used to indicate the playback position along video track representation 260. In some embodiments, time code marker 280 can be a vertical line element, and/or have any other suitable appearance. In some embodiments, time code marker 280 can be positioned in a horizontal direction to any suitable timestamp (e.g., a user input in which a finger placed on or near video track representation 260 moves horizontally to the left or right). In some embodiments, sliding time code marker 280 can cause media content item 250 to be refreshed and/or updated to the new timestamp indicated by time code marker 280. As discussed below in connection with FIG. 2C, time code marker can have additional functions in connection with media overlay elements 271-276.

In some embodiments, toolbar 290 can include any suitable features for editing media content item 250. For example, as illustrated, toolbar 290 can include navigation elements (e.g., video, photos, text, stickers, sounds, etc.) that can direct a user to corresponding menus (e.g., load video footage, add photos, text, stickers, audio, etc.).

Turning to FIG. 2B, an example of a user interface 210 for presenting media content with multiple media elements in an editing environment in accordance with some embodiments is shown. As illustrated, user interface 210 can include video track representation 260, focus screen 265, media overlay elements 273 and 274 in an expanded overlay list, and time code marker 280.

In some embodiments, user interface 210 can follow the presentation of user interface 200 as discussed above in connection with FIG. 1, at block 106 of process 100. In some embodiments, user interface 210 can be displayed in response to receiving a user selection of a point within video track representation 260 in FIG. 2A above.

In some embodiments, user interface 210 can display any suitable number of media overlay elements (e.g., zero, one, two, etc.). In some embodiments, media overlay elements displayed in user interface 210 can represent media elements from the entirety of the media content item loaded in the media editor. In some embodiments, media overlay elements displayed in user interface 210 can be determined by media elements that intersect time code marker 280. In some embodiments, media overlay elements displayed in user interface 210 can be filtered based on user preference (e.g., only visual layers, only audio layers, only stickers, etc.).

In some embodiments, user interface 210 can promote media overlay elements 273 and 274 to the topmost layer within video track representation 260 using any suitable technique. For example, as shown in FIG. 2B, in response to selecting a particular time position (e.g., a time 2:46 within the video), the two media overlay elements that correspond to the two media elements occurring within the video can be presented in a media list and the two media elements can be promoted to a topmost layer in video track representation 260 and in the media content window.

In some embodiments, user interface 210 can use focus screen 265 to bring media overlay elements 273 and 274 to the topmost layer within video track representation 260. As illustrated, user interface 210 can reveal visual characteristics or design features in media overlay elements 273 and 274, and such can indicate the media element corresponding to the media overlay element in some embodiments. For example, media overlay element 273 can have a letter "A" to represent a text box in some embodiments. In another example, media overlay element 274 can be labeled "Bubbles" to represent a bubble graphic sticker in some embodiments.

In some embodiments, media overlay elements 273 and/or 274 can be selected by the user, as discussed above in connection with FIG. 1, at block 108 of process 100.

Turning to FIG. 2C, an illustrative example of a user interface 220 for presenting media content with multiple media elements in an editing environment in accordance with some embodiments is shown. As illustrated, user interface 210 can include media element tool 214, media element 254, video track representation 260, media overlay element 274, and time code marker 284. In some embodiments, user interface 220 can include any other suitable elements.

In some embodiments, user interface 220 can follow the presentation of user interface 210 as discussed above in connection with FIG. 1, at blocks 110, 112, and 114 of process 100. In some embodiments, user interface 220 can be presented in response to receiving a user selection of a media overlay element from user interface 210, such as media overlay element 274 displayed on video track representation 260 in FIG. 2B above.

In some embodiments, media element tool 214 can be any suitable tool that allows a user to modify media element 254. For example, as shown, media element 254 can be a graphic sticker, and media element tool 214 can be a frame surrounding media element 254 with corner handles to modify the size and position of media element 254.

In some embodiments, a user can additionally use editing menus 294 to edit media element 254. For example, as shown, editing menus 294 can include a replace button to change the selected media element to a different media element, an animation button to include or modify a motion effect for application to the content, and a color selector for modifying a color to the components of the media element that are placed within the media content item. In some embodiments, any suitable number of menus can be displayed.

In some embodiments, time code marker 284 can be displayed as the topmost layer on video track representation 260. In some embodiments, media overlay element 274 can be displayed within time code marker 284. In some embodiments, the combined presentation of media overlay element 274 and time code marker 284 can suggest that media element 254 is actively selected and can be edited. In some embodiments, time code marker 284 can have selectable handles, for example, to change the start and/or end time of media element 254.

Figure 2D:
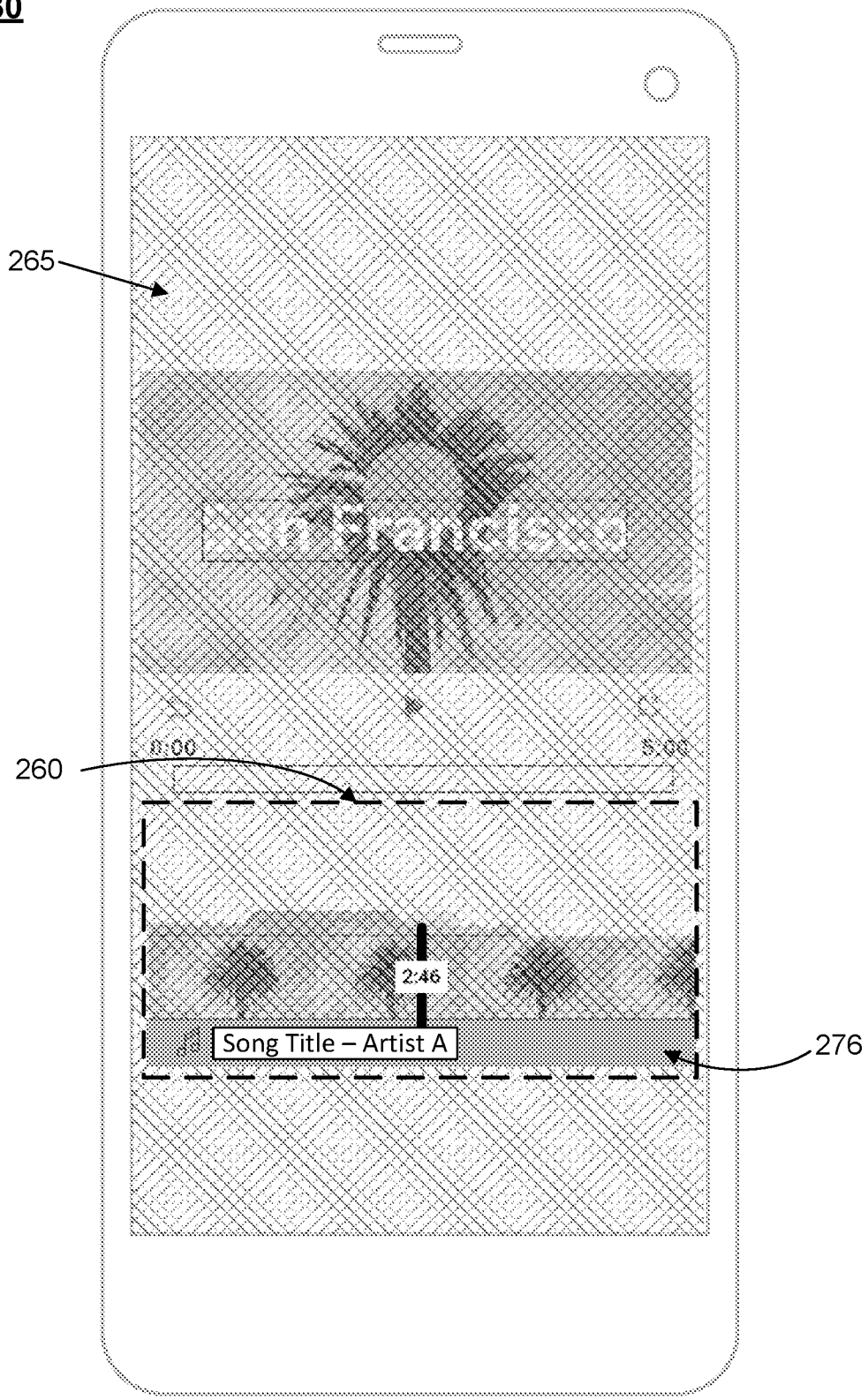

Turning to FIG. 2D, an illustrative example of a user interface 230 for presenting media content with multiple media elements in an editing environment in accordance with some embodiments is shown. As illustrated, user interface 230 can include video track representation 260, focus screen 265, and media overlay element 276. In some embodiments, user interface 230 can follow the presentation of user interface 200 as discussed above in connection with FIG. 1, at block 106 of process 100. In some embodiments, user interface 230 can be displayed when a user selects a media overlay element from user interface 200, such as media overlay elements 271-276 displayed on video track representation 260 in FIG. 2A above. As shown, in some embodiments, media overlay element 276 can indicate an audio track present throughout the runtime in video track representation 260.

Figure 2E:
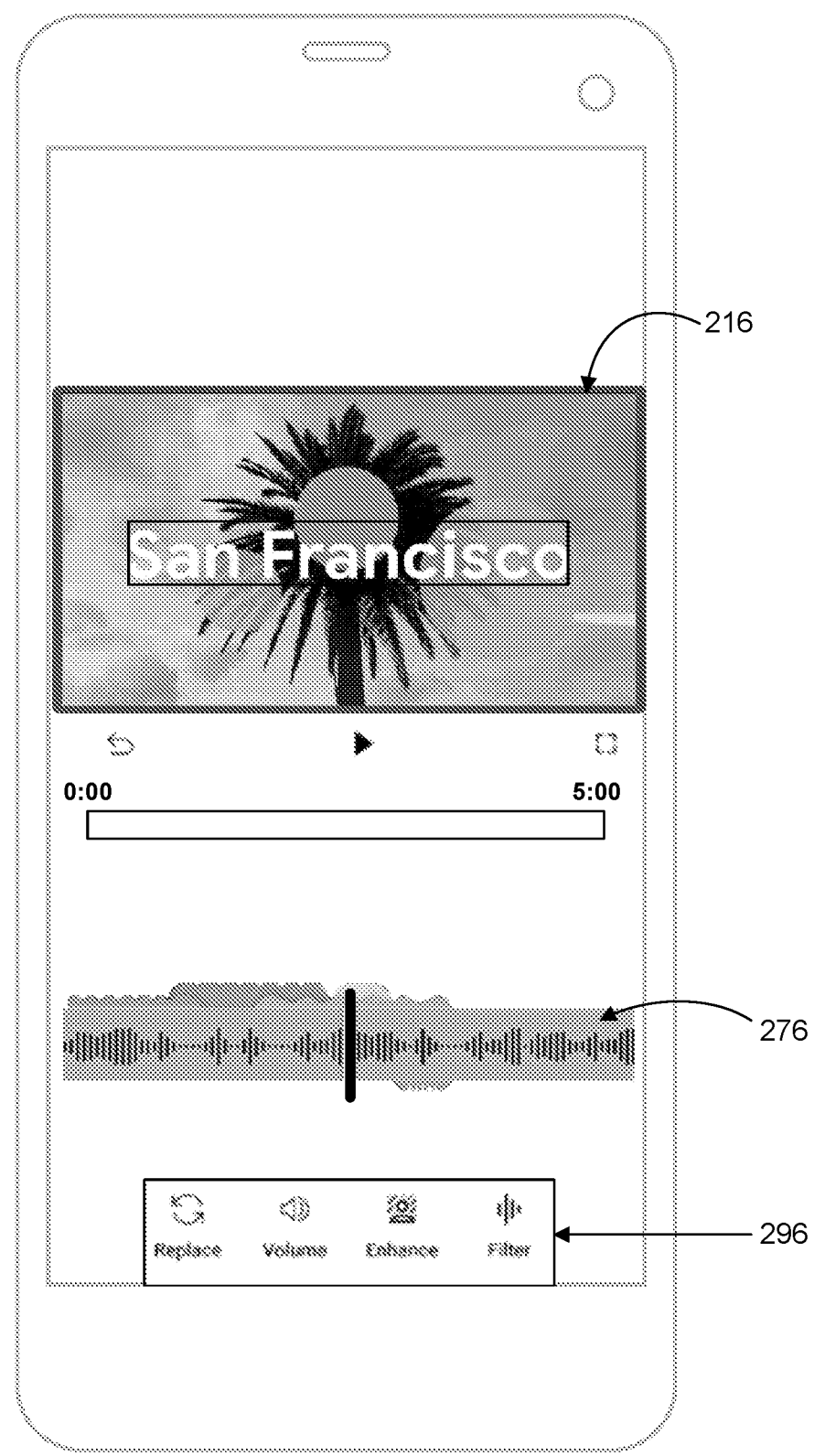

Turning to FIG. 2E, an example of a user interface 240 for presenting media content with multiple media elements in an editing environment in accordance with some embodiments is shown. As illustrated, user interface 240 can include audio indicator 216, video track representation 260, media overlay element 276, and editing menus 296. In some embodiments, user interface 240 can include any other suitable elements.

In some embodiments, user interface 240 can follow the presentation of user interface 230 as discussed above in connection with FIG. 1, at blocks 110, 112, and 114 of process 100. In some embodiments, user interface 240 can be displayed when a user selects a media overlay element from user interface 230, such as media overlay element 276 displayed on video track representation 260 in FIG. 2D above.

In some embodiments, media overlay element 276 can correspond to an audio element. In some embodiments, editing menus 296 can be any suitable audio editing tool such as adjust playback volume, adjust equalizer settings, etc.

Figure 3:
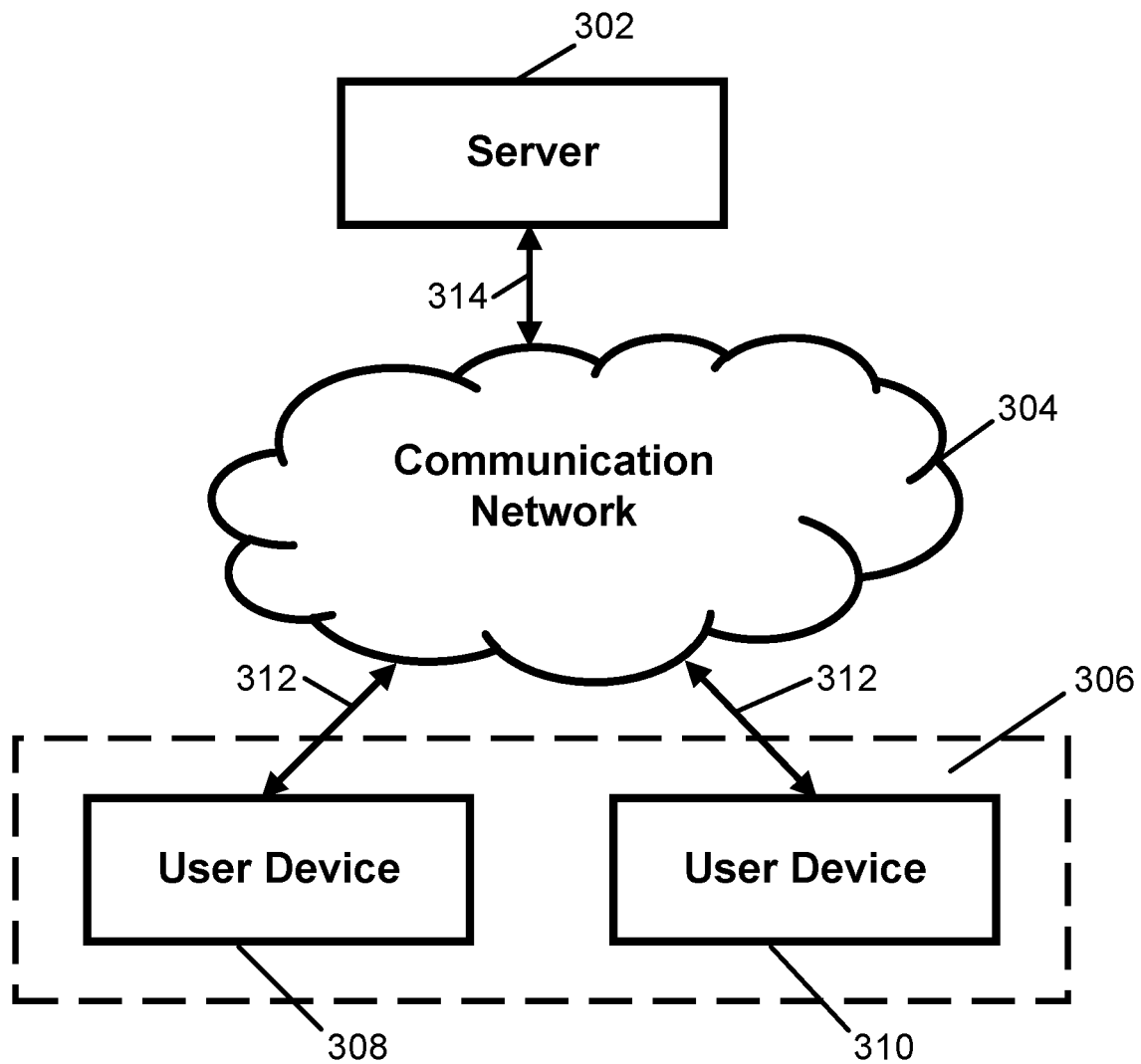
FIG. 3 shows an example of a schematic diagram of a system that could be used to implement mechanisms described herein in accordance with some embodiments of the disclosed subject matter.

Turning to FIG. 3, an example 300 of hardware for presenting media content with multiple media elements in an editing environment in accordance with some embodiments is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some embodiments, server 302 can perform any suitable function(s).

Communication network 304 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for use with user interface 200. In some embodiments, user device 306 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid overcomplicating the figure, any suitable number of user devices, (including only one user device) and/or any suitable types of user devices, can be used in some embodiments.

Figure 4:
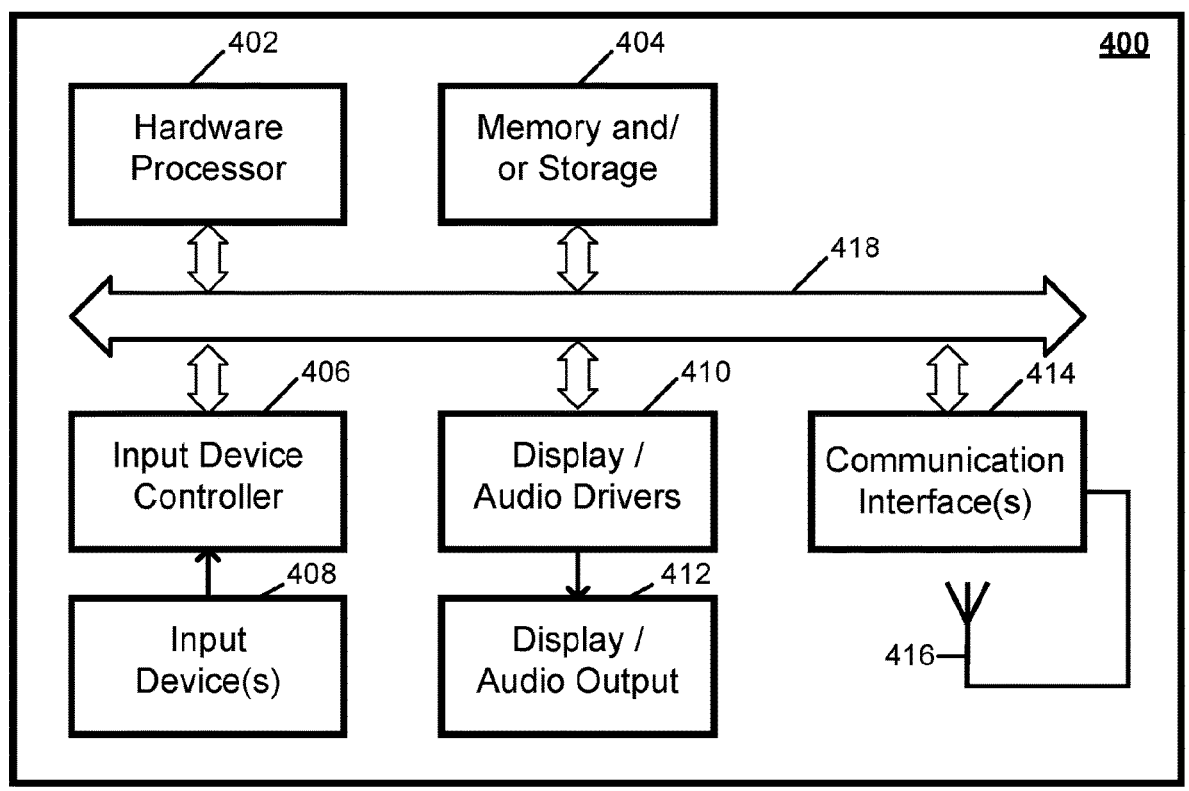
FIG. 4 shows an example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer and can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, a multi-core processor or an array of processors, digital signal processor(s), dedicated logic, and/or any other suitable circuitry for controlling the functioning of a general-purpose computer or a special-purpose computer in some embodiments. In some embodiments, hardware processor 402 can be controlled by a computer program stored in memory and/or storage 404. For example, in some embodiments, the computer program can cause hardware processor 402 to perform functions described herein.

Memory and/or storage 404 can be any suitable memory and/or storage for storing programs, data, documents, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
   receiving, by a computing device having a display, a request to modify a video content item containing a plurality of media elements;
   presenting, by the computing device and using the display, a user interface that includes a video track representation of the video content item and a layered representation of the plurality of media elements occurring within the video content item, wherein each of the plurality of media elements is represented by a media overlay element of a plurality of media overlay elements that has one or more visual characteristics and is positioned proximal to the video track representation, wherein at least one of the plurality of media overlay elements overlaps at least another one of the plurality of media overlap elements in a z-order stacking to provide a compact representation of the plurality of media elements;
   in response to receiving a selected time position within the video track representation, updating, by the computing device, the layered representation within the user interface to present an expanded overlay list that includes media overlay elements corresponding to a subset of the plurality of media elements that occur at the selected time position within the video content item; and
   in response to receiving a selected media overlay element from the media overlay elements corresponding to the subset included in the expanded overlay list, updating, by the computing device, a media window in the user interface to present a video frame corresponding to the selected time position and the media element applied to the video frame corresponding to the selected media overlay element.

2. The method of claim 1, wherein the plurality of media elements includes a plurality of visual layers and wherein the plurality of visual layers are presented in a first layered representation that is positioned above the video track representation in the user interface.

3. The method of claim 1, wherein the plurality of media elements includes a plurality of audio layers and wherein the plurality of audio layers are presented in a second layered representation that is positioned below the video track representation in the user interface.

4. The method of claim 1, wherein, in response to receiving the selected media overlay element from the expanded overlay list, positioning, by the computing device the selected media overlay element within the video track representation and presenting, by the computing device, unselected media overlay elements in the layered representation of the plurality of media elements occurring at the selected time position within the video content item.

5. The method of claim 1, wherein the one or more visual characteristics includes at least one color applied to a media overlay element and at least one pattern applied to the media overlay element.

6. The method of claim 1, wherein the expanded overlay list is presented in place of the layered representation of the plurality of media elements in response to receiving the selected time position within the video track representation and wherein the expanded overlay list is collapsed into the layered representation of the plurality of media elements in response to receiving the selected media overlay element from the expanded overlay list.

7. The method of claim 1, further comprising providing, by the computing device, one or more editing tools associated with the media element applied to the video frame corresponding to the selected media overlay element.

8. The method of claim 1, further comprising:
   determining, by the computing device, that a first media element and a second media element share at least one timestamp on the video track representation; and
   causing, by the computing device, a first media overlay element corresponding to the first media element to have a vertical offset on the video track representation from a second overlay element corresponding to the second media element.

9. The method of claim 1, further comprising:
   determining, by the computing device, that a height of the expanded overlay list being presented on the display of the computing device exceeds the height of the display of the computing device; and
   in response to determining that the height of the expanded overlay list being presented on the display of the computing device exceeds the height of the display of the computing device, allowing, by the computing device, the expanded overlay list to be scrolled in a vertical direction to review each of the media overlay elements in the expanded overlay list.

10. The method of claim 1, wherein each of the media overlay elements has a width that corresponds to a duration of the media element within the video content item.

11. A computing device system for editing media content comprising:
    a display;
    a hardware processor that is configured to:
      receive a request to modify a video content item containing a plurality of media elements;
      present, using the display, a user interface that includes a video track representation of the video content item and a layered representation of the plurality of media elements occurring within the video content item, wherein each of the plurality of media elements is represented by a media overlay element of a plurality of media overlay elements that has one or more visual characteristics and is positioned proximal to the video track representation, wherein at least one of the plurality of media overlay elements overlaps at least another one of the plurality of media overlap elements in a z-order stacking to provide a compact representation of the plurality of media elements;
      in response to receiving a selected time position within the video track representation, update the layered representation within the user interface to present an expanded overlay list that includes media overlay elements corresponding to a subset of the plurality of media elements that occur at the selected time position within the video content item; and in response to receiving a selected media overlay element from the media overlay elements corresponding to the subset included in the expanded overlay list, update a media window in the user interface to present a video frame corresponding to the selected time position and the media element applied to the video frame corresponding to the selected media overlay element.

12. The computing device of claim 11, wherein the plurality of media elements includes a plurality of visual layers and wherein the plurality of visual layers are presented in a first layered representation that is positioned above the video track representation in the user interface.

13. The computing device of claim 11, wherein the plurality of media elements includes a plurality of audio layers and wherein the plurality of audio layers are presented in a second layered representation that is positioned below the video track representation in the user interface.

14. The computing device of claim 11, wherein, in response to receiving the selected media overlay element from the expanded overlay list, the hardware processor is further configured to position the selected media overlay element within the video track representation and present unselected media overlay elements in the layered representation of the plurality of media elements occurring at the selected time position within the video content item.

15. The computing device of claim 11, wherein the one or more visual characteristics includes at least one color applied to a media overlay element and at least one pattern applied to the media overlay element.

16. The computing device of claim 11, wherein the expanded overlay list is presented in place of the layered representation of the plurality of media elements in response to receiving the selected time position within the video track representation and wherein the expanded overlay list is collapsed into the layered representation of the plurality of media elements in response to receiving the selected media overlay element from the expanded overlay list.

17. The computing device of claim 11, wherein the hardware processor is further configured to provide one or more editing tools associated with the media element applied to the video frame corresponding to the selected media overlay element.

18. The computing device of claim 11, wherein the hardware processor is further configured to:
determine that a first media element and a second media element share at least one timestamp on the video track representation; and
cause a first media overlay element corresponding to the first media element to have a vertical offset on the video track representation from a second overlay element corresponding to the second media element.

19. The computing device of claim 11, wherein the hardware processor is further configured to:
determine that a height of the expanded overlay list being presented on the display of the computing device exceeds the height of the display of the computing device; and
in response to determining that the height of the expanded overlay list being presented on the display of the computing device exceeds the height of the display of the computing device, allow the expanded overlay list to be scrolled in a vertical direction to review each of the media overlay elements in the expanded overlay list.

20. The computing device of claim 11, wherein each of the media overlay elements has a width that corresponds to a duration of the media element within the video content item.

21. Non-transitory computer-readable storage media containing computer executable instructions that, when executed by a processor of a computing device having a display, cause the processor to:
receive a request to modify a video content item containing a plurality of media elements;
present, using the display, a user interface that includes a video track representation of the video content item and a layered representation of the plurality of media elements occurring within the video content item, wherein each of the plurality of media elements is represented by a media overlay element of a plurality of media overlay elements that has one or more visual characteristics and is positioned proximal to the video track representation, wherein at least one of the plurality of media overlay elements overlaps at least another one of the plurality of media overlap elements in a z-order stacking to provide a compact representation of the plurality of media elements;
in response to receiving a selected time position within the video track representation, update the layered representation within the user interface to present an expanded overlay list that includes media overlay elements corresponding to a subset of the plurality of media elements that occur at the selected time position within the video content item; and
in response to receiving a selected media overlay element from the media overlay elements corresponding to the subset included in the expanded overlay list, update a media window in the user interface to present a video frame corresponding to the selected time position and the media element applied to the video frame corresponding to the selected media overlay element.

* * * * *